United States Patent Office 3,489,817
Patented Jan. 13, 1970

3,489,817
METHOD FOR THE PRODUCTION OF ADAMANTANE
Eugene C. Capaldi, Broomall, Leonard N. Leum, Media, and Harold Shalit, Drexel Hill, Pa., assignors to Atlantic Richfield Company, Philadelphia, Pa., a corporation of Pennsylvania
No Drawing. Filed June 21, 1968, Ser. No. 738,807
Int. Cl. C07c 3/58
U.S. Cl. 260—666    12 Claims

ABSTRACT OF THE DISCLOSURE

A process for the preparation of adamantane comprising subjecting an alkyl adamantane to hydrodealkylation in the presence of hydrogen and a catalyst impregnated with an alkali metal hydroxide at a temperature in the range of from about 400° F. to about 1000° F. and at a pressure in the range of from about atmospheric to about 5000 p.s.i.g.

BACKGROUND OF THE INVENTION

This invention relates to an improved process for selectively dealkylating alkyl adamantanes. More specifically, this invention relates to a process for the catalytic hydrodealkylation of an alkyl adamantane wherein said alkyl adamantane is treated at a high temperature in the presence of hydrogen, or in the presence of a hydrogen-producing compound, in the presence of a catalyst impregnated with an alkali metal hydroxide and, if desired, in the presence of a diluent gas in order to selectively split off a desired alkyl group or groups from the alkyl adamantane. The invention has particular application to a process for removing one or more methyl groups from a methyl substituted adamantane in order to produce adamantane devoid of said methyl substituents.

Processes for making adamantane are well known in the art. However, these processes generally produce adamantane in low yields. As an example, an article by Paul von R. Schleyer and M. M. Donaldson, J.A.C.S., 82, 4645 (1960), shows the conversion to adamantane by the reaction of trimethylenenorbornane with anhydrous aluminum halide and an acid. Their process produces only an 18 percent yield of adamantane.

A year after the Schleyer article, H. Koch and J. Franken, Brennstoff Chem., 42, 90 (1961), reported a 42 percent yield of adamantane obtained by reacting tetrahydrodicyclopentadiene, also called trimethylenenorbornane, with aluminum chloride and hydrochloric acid at temperatures of 120° C. to 125° C. and at a hydrogen pressure of 40 atmospheres for 3½ hours. Koch and Franken indicated that a 42 percent yield was obtained by this process.

A more recent process for the production of adamantane involves the reaction of aluminum chloride and hydrochloric acid with trimethylenenorbornane at atmospheric pressure and at 70° C. to 120° C. for one to four hours. By this process adamantane in a yield of 45 percent based on the weight of the starting trimethylenenorbornane is produced.

In the co-pending aplication S.N. 738,813 of Capaldi and Leum entitled Process for the Preparation of Adamantane, filed concurrently herewith, there is disclosed a process for the hydrodealkylation of an alkyl adamantane. A disadvantage of the process as disclosed in said co-pending application resides in the fact that the catalyst tends to become rapidly deactivated and must, therefore, be regenerated quite frequently. In accordance with the present invention, it has now been discovered that by impregnating the catalyst with an alkali metal hydroxide such as, for example, sodium hydroxide, the useful life of the catalyst is substantially increased thereby permitting longer periods of use prior to regeneration.

There is thus provided a more efficient and economical process wherein high yields of admanatane are obtained while at the same time effective catalyst life is extended.

SUMMARY OF INVENTION

In accordance with the present invention a process is now provided wherein alkyl adamantanes are converted to adamantane. In the method of this invention an alkyl-substituted adamantane is contacted with hydrogen and a catalyst impregnated with an alkali metal hydroxide at elevated temperatures in a vessel suitable for carrying out catalytic reaction. The portion of the charge stock which remains undealkylated or which is incompletely dealkylated (as, for example, with a 1,3,5-trimethyladamantane feed stream) can be recycled to the reactor until the maximum ultimate conversion to adamantane has been effected.

The alkyl adamantane can contain one methyl group or it can contain more than one methyl group. Additionally the alkyl adamantane can contain higher alkyl groups. In the case of polymethyl substituted adamantanes one or more of the methyl groups can be removed. Representative alkyl adamantanes which can be dealkylated in accordance with the method of this invention are 1-methyladamantane, 1,3-dimethyladamantane, 1,3,5-trimethyladamantane, 1,3,5,7-tetramethyladamantane, 1-methyl-3-ethyladamantane, 1,3-dimethyl-5-ethyladamantane.

It is therefore an object of the present invention to provide a novel and effective method for the dealkylation of alkyl adamantanes in the presence of a catalyst having a prolonged effective catalyst life.

Another object of this invention is to provide an economical method for removing certain alkyl groups from an alkyl adamantane without at the same time effecting scission of the adamantane molecule at other points where such scission is not desired.

Yet another object of this invention is to provide a novel method for demethylating a methyl adamantane to produce adamantane.

A further object is to achieve the above objects while at the same time obtaining high yields of adamantane.

Other objects, advantages, and features of our invention will be apparent to those skilled in the art without departing from the spirit and scope of our invention, and it should be understood that the latter is not necessarily limited to the accompanying discussion.

In one aspect our invention relates to a process for dealkylating an alkyl adamantane comprising subjecting said alkyladamantane to hydrodealkylation in the presence of hydrogen and a catalyst impregnated with an alkali metal hydroxide, said alkali metal hydroxide being present in an amount in the range of from about 0.1 to about 5 weight percent.

In another aspect our invention relates to a process for the demethylation of a methyl substituted adamantane which comprises contacting said methyl substituted adamantane with hydrogen at a temperature in the range of from about 400° F. to about 1000° F., at a pressure in the range of from about atmospheric to about 5000 p.s.i.g., in the presence of a catalyst selected from the groups VI–B and VIII of the Periodic Table said catalyst being impregnated with an alkali metal hydroxide said alkali metal hydroxide being present in an amount in the range of from about 0.1 to about 5 weight percent.

PREFERRED EMBODIMENT

In the preferred method of our invention an alkyl adamantane having from one to four methyl substituents is subjected to dealkylation in the presence of hydrogen and a catalyst impregnated with an alkali metal hydroxide.

The catalysts employed herein comprise an active metal hydrogenation catalyst or compound thereof, which metal may be any of the heavy metals, i.e., those having an atomic weight of 22 or above. A preferred class of metals consists of those belonging to Groups VI-B and VIII of the Periodic Table. These metals are chromium, molybdenum, tungsten, uranium, iron, cobalt, nickel, ruthenium, rhodium, palladium, osmium, iridium, and platinum. The catalysts can be employed as such or in the form of their oxides, or other compounds thereof, such as the sulfides, sulfates, phosphides or phosphates.

The above metals or their oxides are employed, singly or in admixture with another, or they may be deposited on a carrier such as alumina, silica gel, zirconia, thoria, magnesia, titania, acid activated clays, bauxite, diatomaceous earth, crushed porcelain, activated carbon, Fuller's earth, kaolin, kieselguhr, or any other refractory material or naturally occurring sorbent clay, which has no adverse effect on the reaction. It is preferred to suspend the active catalyst material on such a carrier.

The alkali metal hydroxide is incorporated into the catalyst by impregnation at any stage of the catalyst manufacture. Preferably, the alkali metal hydroxide is impregnated on the catalyst after the other active materials have been incorporated. After impregnation, the catalyst containing the alkali metal hydroxide can be prepared for use by drying at 200° F. to about 300° F. with or without calcining at temperatures of from about 500° F. to about 1500° F.

The amount of alkali metal hydroxide employed can vary in the range of from about 0.1 weight percent to about 5 weight percent. It is preferred, however, to use a catalyst which has been impregnated with approximately 1 weight percent of an alkali metal hydroxide. Catalyst containing in excess of approximately 6 weight percent alkali metal hydroxide are ineffective in the method of this invention.

The alkali materials which can be employed in our invention are preferably the hydroxides of the alkali metals, for example, sodium hydroxide, potassium hydroxide, lithium hydroxide and cesium hydroxide. A particularly suitable and preferred alkali metal hydroxide is sodium hydroxide.

A particularly suitable and preferred catalyst is nickel deposited on kieselguhr, said catalyst having incorporated therein approximately 1 weight percent sodium hydroxide. The nickel content of the catalyst can vary within the range of from about 5 weight percent to 90 weight percent. ⅛ inch by ⅛ inch extuded 60 percent nickel on kieselguhr, however, is particularly suitable and is preferred. If desired the catalyst impregnated with the alkali metal hydroxide can be pretreated at high temperature and high pressure with hydrogen, e.g. the catalyst can be contacted with hydrogen at a temperature in the range of from about 500° F. to about 1500° F. and at a pressure of from about 200 p.s.i.g. to about 1000 p.s.i.g.

The temperatures employed in the reaction can vary in the range of from about 400° F. to about 1000° F., preferably the temperature is maintained in the range from about 500° F. to 800° F.

The pressure employed for the reaction can be superatmospheric, subatmospheric, or atmospheric. Best results, however, are obtained at pressures in the range of from about atmospheric to about 5000 p.s.i.g., preferably at pressures in the range of from about 300 p.s.i.g. to about 1000 p.s.i.g. Pressure above atmospheric are preferred inasmuch as higher conversions are usually obtained than at atmospheric pressure, and also high pressures increase the capacity of the reactor thereby increasing proportionately the permissible liquid hourly space velocity for a given degree of conversion.

Generally, under the conditions of temperature and pressure as hereinabove set forth, the space velocity is held in the range of from about 0.05 to about 20. Higher space velocities can, of course, be used with a more active catalyst and for a given catalyst at higher temperatures. However, a liquid hourly space velocity in the range of from about 0.05 to about 5 is preferred when employing temperatures in the range of from about 500° F. to about 800° F. The space velocity as used herein is defined as the volumes of liquid charge per volume of catalyst per hour, the liquid being measured at room temperature.

It will be apparent to those skilled in the art that the process conditions i.e., conditions of temperature, pressure, and space velocity are inter-related and should be correlated for each specific operation. Thus, low space velocity, high pressure, and high temperatures cooperate in the direction of producing more severe and more effective operating conditions, while high space velocity, low pressure, and low temperature tend to produce the opposite results.

Where hydrogen gas, as such, is employed, any amount can be used, ranging from about 0.5 to about 20 moles of hydrogen per mole of feed material, depending to some extent upon the number of alkyl groups which it is desired to remove, and also the pressure under which the reaction is carried out. Higher hydrogen ratios are employed when a higher number of alkyl groups are to be removed or when the reaction is conducted at relatively low pressures, and conversely for removing only one alkyl group. When operating at high pressures, somewhat lower hydrogen ratios can be employed. The preferred range when dealkylating a methyl substituted adamantane in accordance with this invention is generally from about 1 to about 5 moles of hydrogen per mole of feed material.

The reaction conditions of the process may be so varied that the alkyl adamantane can be either completely dealkylated or only partially dealkylated. Generally, the milder reaction conditions, i.e., low temperatures, low pressures, high space velocity and low mole ratio of hydrogen to hydrocarbon are employed where partial dealkylation is desired, while the more opposite extremes are employed for obtaining complete dealkylation.

If desired, the reaction can be carried out in the presence of a diluent. The material employed as a diluent can be any substance which exists in the gaseous state under the reaction conditions employed, and which is also stable and non-reactive with the other components of the reaction mixture. Examples of such compounds are water vapor, nitrogen, methane, helium, neon, argon, carbon monoxide and mixtures of such materials. Where hydrogen gas is employed as the hydrogenating agent, the use of water vapor as the diluent is substantially more effective than any of the other materials and its use is preferred.

The amount of the diluent used is measured in terms of molar ratio relative to the feed material; at low total reaction pressures, lower ratios of diluent may be employed, while at high pressures higher ratios are preferred. The diluent ratio can range from between about 0.5 to about 20 moles thereof per mole of feed material. When operating within the preferred pressure ranges in the range of from about 300 p.s.i.g. to about 1000 p.s.i.g., it is preferred to use from about 1 to about 5 moles of diluent per mole of feed material. The optimum diluent ratio can also depend to some extent upon the specific feed material, the catalyst, the hydrogen partial pressure, and the temperature. These factors are correlated and balanced in each specific case.

Since the process of this invention can be carried in either liquid phase, vapor phase, or mixed liquid and vapor phase, the reaction can be carried out in any suitable type of reactor which is adapted for contacting gases or liquids with solids at high temperatures. Either continuous or cyclic operation can be used. In continuous operation, the catalyst in granular, powder or pelleted form is contacted countercurrently or co-currently while flowing through the reactor, with a stream of the reactant gas or liquid, and a product stream is removed near the opposite end of the reactor from the feed inlet. Heat may be supplied by suitable preheating of the catalyst, or by internal or external heating of the reactor itself, or by preheating the feed. The contact time and heat supply can be regulated by suitably adjusting the flow rates of catalyst and feed. Catalyst removed from the solids outlet end of the reactor is then ordinarily regenerated and reheated to the reaction temperature and recycled to the solids-inlet end of the reactor. If superatmospheric pressures are employed, suitable pressure seals are provided at the solids inlet and outlet ports. In cyclic operation a plurality of stationary beds of catalyst are ordinarily employed, whereby some of the units can be maintained on stream at all times while others are undergoing regeneration or cleaning operations. Heat is ordinarily supplied externally or by internal heating elements, and the operation can be conducted at atmospheric pressures or above. The above types of operation are essensitally similar in the mechanics of operation to catalytic conversion processes which have heretofore been widely employed for the conversion of various hydrocarbon materials.

The reaction product comprising adamantane and alkyl adamantanes can be recycled to the inlet of the reactor, or, if desired, at least a portion of the alkyl adamantane which remains undealkylated or which is incompletely dealkylated (as with polyalkyl-substituted charge materials) can be recycled to the reactor, until the maximum ultimate conversion to adamantane has been achieved. If desired, adamantane, which solidifies upon cooling of the reaction product, can be separated from said reaction product by any suitable mechanical means, such as, for example, filtration. The remaining portion of the reaction product can then be recycled to the reactor.

The following examples are for the purpose of demonstrating the process of the present invention. It must be strictly understood that this invention is not to be limited by the reactants and conditions used in the examples, nor by the operations and manipulations involved therein. As will be apparent to those skilled in the art, other reactants and conditions, as hereinbefore set forth, can be used to practice this invention.

EXAMPLE I

A catalyst bed containing 100 ml. of 60 percent nickel by weight on kieselguhr and 0.84 weight percent sodium hydroxide, was preheated by passing hydrogen through said bed for 16 hours at 1000° F. and at a pressure of 350 p.s.i.g. and at a hydrogen flow rate of 450 ml./min. (measured at standard temperature and pressure). Thereafter hydrogen at 350 p.s.i.g. was passed through said bed at the rate of 450 ml./min. (measured at standard temperature and pressure) and 1,3-dimethyladamantane was charged at the rate of 8.7 ml./hr. for 5.75 hours. The temperature of the catalyst bed was maintained at 642° F. A 98 percent recovery was obtained with a 48.3 percent conversion and a 95 percent yield of hydrodealkalated dimethyladamantane (39 weight percent adamantane and 61 weight percent 1-methyladamantane) as determined by gas chromatography.

The catalyst was prepared by soaking 150 grams of 60 percent nickel by weight on kieselguhr in 100 ml. of a 3 weight percent aqueous sodium hydroxide solution for one hour. The catalyst was then drained and dried in an oven at 230° F. for approximately 16 hours. The finished catalyst contained, in addition to the 60 weight percent nickel approximately 0.84 weight percent sodium hydroxide.

Recovery, conversion, and yield are defined as follows:

$$\text{Recovery} = \frac{\left(\begin{array}{c}\text{moles 1,3-} \\ \text{dimethyl} \\ \text{adamantane}\end{array} + \begin{array}{c}\text{moles} \\ \text{methyl} \\ \text{adamantane}\end{array} + \begin{array}{c}\text{moles} \\ \text{adamantane}\end{array}\right) \text{Recovered}}{\text{moles of 1,3-dimethyladamantane charged}} \times 100$$

$$\text{Conversion} = \frac{\text{moles of 1,3-dimethyladamantane converted}}{\text{moles of 1,3-dimethyladamantane charged}} \times 100$$

$$\text{Yield} = \frac{\left(\begin{array}{c}\text{moles of} \\ \text{methyladamantane}\end{array} + \text{moles of adamantane}\right) \text{Recovered}}{\text{moles of 1,3-dimethyladamantane converted}} \times 100$$

EXAMPLE II

A catalyst bed containing 10 ml. of 60 percent nickel by weight on kieselguhr and 0.84 weight percent sodium hydroxide, was pretreated by passing hydrogen through said bed for 16 hours at 1000° F., and at a pressure of 350 p.s.i.g. and at a hydrogen flow rate of 450 ml./min. (measured at standard temperature and pressure). Thereafter, hydrogen at 350 p.s.i.g. was passed through said bed at the rate of 450 ml./min. (measured at standard temperature and pressure) and a feed comprising 78 weight percent 1,3-dimethyladamantane, 18 weight percent 1-methyladamantane, and 4 weight percent adamantane was charged at the rate of 8.5 ml./hr. for one hour. The temperature of the bed was maintained at 690° F. The recovery was in excess of 90 percent. The conversion of 1,3-dimethyladamantane was 78 percent. The 78 weight percent 1,3-dimethyladamantane in the feed decreased to 17 weight percent in the product. The 18 weight percent of 1-methyladamantane in the feed increased to 38 weight percent in the product, and the 4 weight percent adamantane in the feed increased to 45 weight percent in the product.

The catalyst was prepared by soaking 150 grams of 60 percent nickel by weight on kieselguhr in 100 ml. of a 3 weight percent aqueous sodium hydroxide solution for one hour. The catalyst was then drained and dried in an oven at 230° F. for approximately 16 hours. The finished catalyst contained in addition to the 60 percent nickel, approximately 0.84 weight percent sodium hydroxide.

EXAMPLE III

The procedure of Example I is repeated except that the catalyst bed comprises 40 percent cobalt oxide by weight on an alumina carrier and 3 weight percent potassium hydroxide. The recovery is in excess of 50 percent with a conversion in excess of 20 percent and a yield of hydrodealkylated dimethyladamantane (the weight percent of adamantane being in excess of 30 percent) in excess of 30 percent.

EXAMPLE IV

The procedure of Example I is repeated except that there is additionally charged to the catalyst bed water vapor at a rate to provide 5 moles of diluent (i.e., water vapor) per mole of feed material. The recovery is in excess of 50 percent with a conversion in excess of 20 percent and a yield hydrodealkylated dimethyladamantane (the weight percent adamantane being in excess of 30 percent )in excess of 20 percent.

EXAMPLE V

The procedure of Example I is repeated except that there is charged to the catalyst bed 1-propyladamantane rather than 1,3-dimethyladamantane. The recovery is in excess of 40 percent with a conversion in excess of 40 percent and a yield of hydrodealkylated product (the weight percent adamantane is in excess of 20 percent) in excess of 40 percent. That effective catalyst life is extended is clear from Example VI and Table I.

EXAMPLE VI

In runs number 1 and 2 of Table I the catalyst bed comprised 100 ml. of 60 percent nickel by weight on kieselguhr. The catalyst bed was not regenerated after run 1. After one hour of operation the product had the following analysis; 58 weight percent 1,3 - dimethyladamantane, 27 weight percent 1-methyladamantane, and 14 weight percent adamantane. The product collected during the second hour of operation comprised 99 weight percent 1,3 - dimethyladamantane and merely trace amounts of 1-methyladamantane and adamantane. It is therefore clear that little hydrodealkylation occurred during the second hour of operation.

Runs 3 through 6 however, were made with the use of a catalyst bed comprising 100 ml. of 60 percent nickel by weight on kieselguhr, said catalyst having incorporated therein approximately 0.84 weight percent sodium hydroxide. The catalyst bed was not regenerated between the successive runs. It is quite clear from these runs that even after approximately 7.75 hours of operation, substantial hydrodealkylation of 1,3-dimethyladamantane occurred.

Prior to run 1 and run 3 the catalyst bed was pretreated in the manner as set forth in Example 1.

The catalyst comprising 60 percent nickel by weight on kieselguhr said catalyst having incorporated therein approximately 0.84 weight percent sodium hydroxide was prepared in the manner as set forth in Example 1.

TABLE I

| Run No | 1 | 2 | 3 | 4 | 5 | 6 |
|---|---|---|---|---|---|---|
| Operating conditions: | | | | | | |
| Pressure, p.s.i.g | 350 | 350 | 350 | 350 | 350 | 350 |
| Temperature, °F | 630 | 630 | 642 | 642 | 642 | 642 |
| Hydrogen flow rate, ml./min. (measured at std. temp. and pres.) | 450 | 450 | 450 | 450 | 450 | 450 |
| LHSV (Liquid Hourly Space Velocity) | 0.11 | 0.11 | 0.10 | 0.07 | 0.09 | 0.11 |
| Catalyst bed cumulative operating time, hrs | 1 | 2 | 2 | 4 | 5.75 | 7.75 |
| Feed charged, ml | 11 | 11 | 20 | 14 | 15.75 | 22 |
| Analysis of product of each individual run weight, Percent: | | | | | | |
| 1,3 dimethyladamantane | 58 | 99 | 55 | 68 | 50 | 61 |
| Methyladamantane | 27 | Trace | 29 | 21 | 29 | 22 |
| Adamantane | 14 | Trace | 16 | 11 | 21 | 17 |
| Overall recovery | 84 | | | | 89 | |
| Conversion | 53 | | | | 51 | |
| Yield (weight percent) | 70 | | | | 79 | |
| Adamantane | 34 | | | | 40 | |
| Methyladamantane | 66 | | | | 60 | |

From the foregoing description it will be apparent that the present invention results in a method for obtaining adamantane from alkyl adamantanes in a manner which has not heretofore been employed. It will be understood that various modifications and alterations of the invention will become apparent and can be made by those skilled in the art without departing from the spirit and scope thereof, and that the specific details hereinabove set forth are purely illustrative.

Having thus described our invention, it should be understood that no undue limitations or restrictions are to be imposed by reasons thereof.

We claim:

1. A process for dealkylating an alkyl adamantane comprising subjecting said alkyladamantane to hydrodealkylation in the presence of hydrogen and a catalyst selected from the group VI-B and VIII of the Periodic Table impregnated with an alkali metal hydroxide, said alkali metal hydroxide being present in an amount in the range of from about 0.1 to about 5 weight percent.

2. The process according to claim 1 wherein said alkyl adamantane has at least one methyl substituent.

3. The process according to claim 1 wherein said hydrodealkylation takes place at a temperature from about 400° F. to about 1000° F.

4. The process according to claim 3 wherein the temperature is in the range from about 500° F. to 800° F.

5. The process according to claim 3 wherein said hydrodealkylation takes place at a pressure in the range of from about atmospheric to about 5000 p.s.i.g.

6. The process according to claim 5 wherein said pressure is maintained in a range of from about 300 p.s.i.g. to about 1000 p.s.i.g.

7. The process according to claim 1 wherein said hydrodealkylation takes place in the presence of a diluent.

8. A process for the demethylation of a methyl substituted adamantane which comprises contacting said methyl substituted adamantane with hydrogen at a temperature in the range of from about 400° F. to about 1000° F., at a pressure in the range of from about atmospheric to about 5000 p.s.i.g., in the presence of a catalyst selected from the groups VI-B and VIII of the Periodic Table said catalyst being impregnated with an alkali metal hydroxide said alkali metal hydroxide being present in an amount in the range of from about 0.1 to about 5 weight percent.

9. The process according to claim 8 wherein said catalyst comprises a metal selected from the groups VI-B and VIII of the Periodic Table supported on a carrier said catalyst having incorporated therein from about 0.1 weight percent to about 5 weight percent of an alkali metal hydroxide.

10. The process according to claim 9 wherein said catalyst comprises 60 percent nickel by weight supported on kieselguhr said catalyst having incorporated therein about one weight percent sodium hydroxide.

11. The process according to claim 10 wherein hydrogen is present in the amount in the range of from about 0.5 to about 20 moles of hydrogen per mole of said methyl substituted adamantane.

12. A process for dealkylating an alkyladamantane which comprises subjecting said alkyladamantane to hydrodealkylation at a temperature in the range of from about 400° F. to about 1000° F., at a pressure of from about atmospheric to about 5000 p.s.i.g., in the presence of hydrogen in the range from about 0.5 to 10 moles of hydrogen per mole of said alkyl adamantane and a catalyst selected from groups VI-B and VIII of the Periodic Table, said catalyst being impregnated with an alkali metal hydroxide said alkali metal hydroxide being present in an amount in the range of from about 0.1 to about 5 weight percent.

References Cited

UNITED STATES PATENTS 3,418,387  12/1968  Hala et al. _____ 260—666

DELBERT E. GANTZ, Primary Examiner

VERONICA O'KEEFE, Assistant Examiner